Patented Sept. 24, 1929.

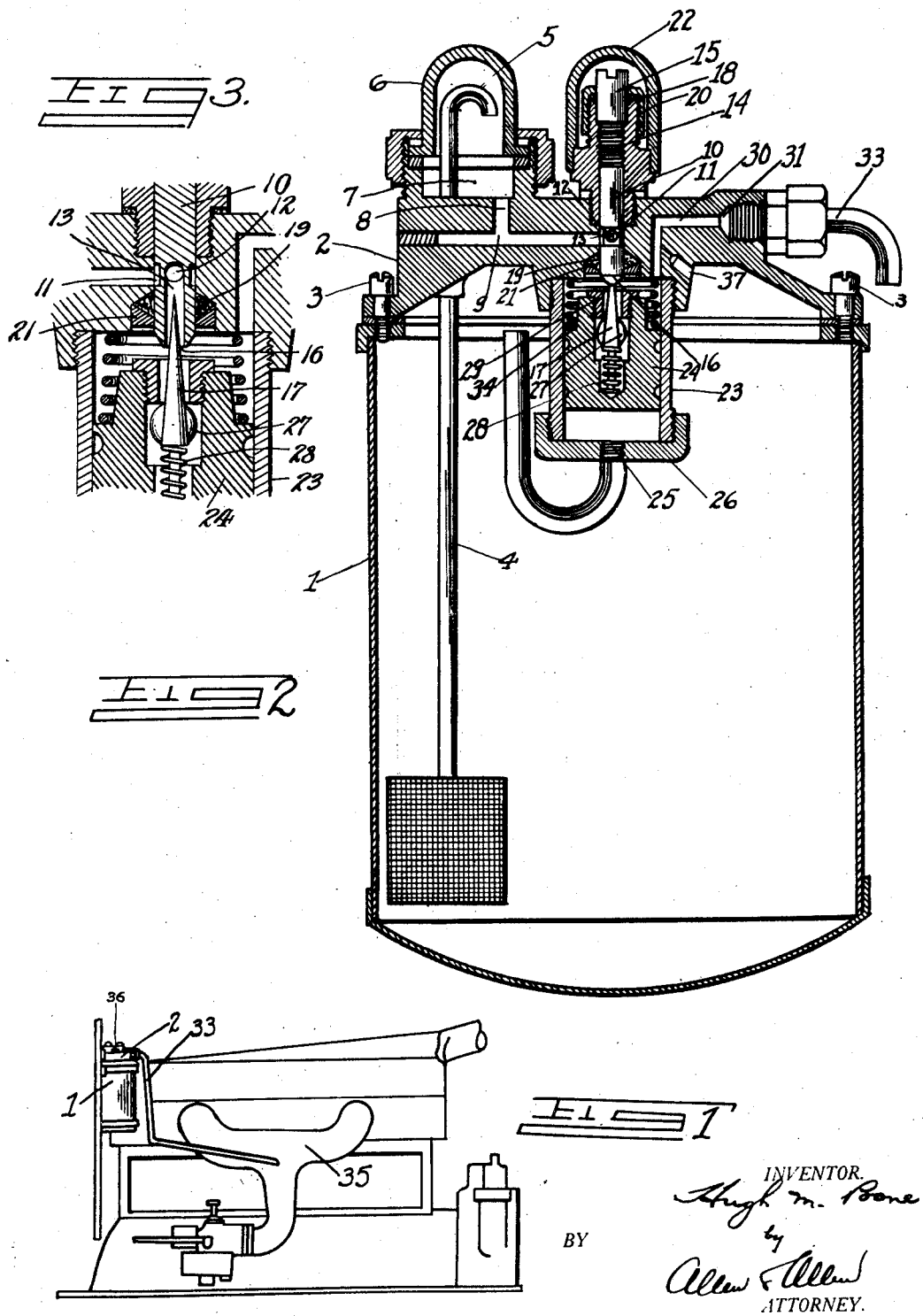

1,728,916

UNITED STATES PATENT OFFICE

HUGH M. BONE, OF COLUMBUS, OHIO

APPARATUS FOR TREATMENT OF FUELS

Application filed April 22, 1926. Serial No. 103,981.

My invention relates to apparatus which may be suitably used to supply lubricant or other fuel treating agents to automobile engines.

It is the object of my invention to provide apparatus which will automatically supply a regulated quantity of a fuel treating agent such as lubricating oil, decarbonizing fluid, or water, preferably to the intake of an automobile engine. As the vacuum on the intake to the average automobile engine is maintained substantially in inverse proportion to the speed of the engine under ordinary operating condition, it is my object to provide apparatus which will automatically feed a regulated supply of some fuel treating agent in inverse proportion to the vacuum being pulled by the engine so that the fuel treating fluid will be fed into the engine cylinders in a more uniformly proportioned manner with respect to the speed of the engine. It is further my object to provide apparatus which will automatically shut off the supply of fuel treating fluid when the operation of the engine is discontinued.

The functions of my apparatus have been performed by other mechanisms such, for example, as that disclosed in the Patent #1,466,857 to E. O. Sterns, to which reference is hereby made. My structure consists in improvements in such devices, the novel usefulness of which consists in its greater adjustability and increased successfulness of operation.

Referring to the drawings:

Figure 1 is a side elevation of an assembly showing my apparatus in combination with the intake of an automobile engine.

Figure 2 is a sectional detail view of the apparatus illustrating its inner construction.

Figure 3 is an enlarged detail vertical sectional view of the valve mechanism employed in the present invention.

1 represents an auxiliary tank adapted as a reservoir for the lubricants, super-fuels or other fluid desired to inject into the combustion chamber of an automobile engine. 2 represents the head of the reservoir 1 which is held in place by means of the screws 3. A conduit 4 leads down into the reservoir 1 to a position close to the bottom thereof, the upper end of which terminates in a goose neck 5 within the glass dome 6. A well 7 is provided with the drainage outlet 8 communicating with the channel 9 which terminates at the valve stem 10. Said valve stem 10 is provided with the annular groove 11 having ports 12 communicating with the hollow portion 13 of said stem 10. The upper end of the stem 10 is threaded as at 14 so as to be adjusted in relation to the head 2. The lower end of the hollow stem 10 terminates in a valve seat 16 adapted to form a seat for the valve 17. The stem is packed as at 18 and 19 and is provided with packing nuts 20 and 21, respectively. A shell 22 encloses the upper end of the stem so as to provide a neat finish and a protection to the protruding parts. A cylinder 23 adapted to receive the piston 24 is provided with a perforated end closure 25 and piston stop 26. The valve 17 is provided with a ball mounting 27 and rests on a spring 28, to prevent the wedging of the valve 17 in the seat 16. The mounting has sufficient freedom to permit automatic correction of an off center or out of line needle position, or both, with respect to its seat. A bushing 29, retains the valve in its position in relation to the piston. The channel 30 provides communication between the outlet 31, and the space in the upper end of the cylinder 23, thus providing a complete conduit from the interior of the reservoir 1 to the tube 33.

As the engine is started, the piston displacement creates a vacuum in the tube 33, thus having a tendency to draw the fluid from the reservoir 1. The spring 34 tending to hold the valve 17 normally away from the seat 16.

In order to provide the desired fluid in proportion to the speed or load of the engine, I find it practical to utilize the fluctuation of vacuum in the intake manifold; hence, by employing the hereinbefore described reservoir and parts thereof, it will be seen that as the vacuum is increased in the manifold 35, and consequently in the tube 33, the piston 24 will be drawn upward, thus decreasing the opening between the valve 17 and the seat 16. As the taper on the valve 17 is very slight, a great movement thereof is permitted without exceedingly modifying the opening between it and said seat 16, thus giving a wide range of movement and an accurate adjustment of flow therethrough. Since it is well known that the throttling down of the engine to decrease the speed thereof increases the vacuum in the manifold 35; this increased vacuum is utilized to lessen the flow of fluid, since less fluid is then required and as the opening of said throttle to increase the speed of the engine or to take care of an increased load, causes a decrease in the vacuum, the spring 34 permits the increasing of the opening between said valve 17 and seat 16, thereby permitting a greater flow of said fluid.

It is immaterial, as far as this invention is concerned, what fluid is utilized in this system. It is pertinent that any fluid designed to be supplied into the combustion chamber may be provided by means of this apparatus. The viscosity of the fluid may be allowed for by the manipulation of the valve stem 10, through the medium of the threaded portion 14. This adjustment also takes care of predetermined quantity of fluid to be normally supplied.

For filling the tank 1 with fluid, a cap 36, having an air vent will be suitably located in the head 2 of the tank. This cap is merely indicated as it is of similar type to the ordinary gasoline tank cap.

In order to prevent siphoning of fluid after the engine has stopped, the siphon vent 37, of small size so as not to interfere with the operation of the valve, is provided in the head 2, between the channel 30 and the interior of the tank. This permits atmosphere pressure to be established in the conduit to the intake manifold.

Having thus described my invention what I claim as new and desire to secure by Letters Patent is:—

1. Apparatus for the treatment of fuels having a feed device controlled in proportion to the vacuum in a fuel feed line comprising a tank for a supply of treatment fluid, a head for said tank having an air vent therein, said head having a well into which fluid passing through said supply pipe will flow, said head also having a passage extending therein to a valve, said valve comprising a seat adjustable exteriorly of said tank, and a needle element adapted to seat on said seat, a discharge pipe from the discharge side of said valve adapted to be connected with a fuel intake line, and means for carrying said needle and moving it relative to its seat comprising a cylinder with a piston therein, and an opening connected with said discharge pipe.

2. Apparatus for the treatment of fuels in an internal combustion motor comprising in combination with a supply reservoir for fuel treating material, and a conduit to said motor extending therefrom, a valve for regulating the passage of said material from said reservoir, means for regulating said valve in proportion to vacuum within said conduit, an air inlet in said reservoir, and a communicating passage between said conduit and said reservoir for breaking the vacuum within said conduit.

3. Apparatus for the treatment of fuels in an internal combustion motor comprising in combination with a supply reservoir for fuel treating material, and a conduit to said motor extending therefrom, a valve for regulating the passage of said material from said reservoir, means for regulating said valve in proportion to vacuum within said conduit, an air inlet in said reservoir, and a communicating passage between said conduit and said reservoir for breaking the vacuum within said conduit, whereby the material will not be siphoned through said conduit subsequent to the stoppage of the motor.

4. Apparatus for the treatment of fuels having a feed device controlled in proportion to the vacuum in a fuel feed line comprising a tank for a supply of treatment fluid, a head for said tank having an air vent therein, said head having a supply pipe extending adjacent the bottom of said tank, said head having a well into which fluid passing through said supply pipe will flow, said head also having a passage extending therein to a valve, said valve comprising a seat adjustable exteriorly of said tank, and a needle element adapted to seat on said seat, a discharge pipe from the discharge side of said valve adapted to be connected with a fuel intake line, and means for carrying said needle and moving it relative to its seat comprising a cylinder with a piston therein, and an opening connected with said discharge pipe, and said piston so disposed in said cylinder as to carry said needle into engagement with its seat in proportion to the vacuum within said opening.

HUGH M. BONE.